United States Patent Office 3,384,650
Patented May 21, 1968

3,384,650
1-ACYLOXY-π-ALLYLCOBALT TRICARBONYLS
AND PREPARATION THEREOF
Richard F. Heck, McDaniel Crest, Del., assignor to
Hercules Incorporated, a corporation of Delaware
No Drawing. Filed June 10, 1965, Ser. No. 463,008
17 Claims. (Cl. 260—439)

This invention relates to a new class of organocobalt compounds; namely, the 1-acyloxy-π-allylcobalt tricarbonyls, and to a method for their preparation.

According to the present invention, 1-acyloxy-π-allylcobalt tricarbonyls are produced by the reaction of organocobalt tetracarbonyls with α,β-unsaturated aldehydes or ketones. The organocobalt tetracarbonyls suitable for the purposes of this invention are selected from the group consisting of organocobalt tetracarbonyls having the general formula R—Co(CO)$_4$ and organocobalt tetracarbonyls having the general formula $$R-\overset{O}{\underset{\|}{C}}-Co(CO)_4$$

in which R in both formulas represents alkyl, alkenyl, cycloalkyl, cycloalkenyl, aralkyl, aralkenyl hydrocarbon residues, and substituted alkyl, alkenyl, cycloalkyl, cycloalkenyl, aralkyl, and aralkenyl hydrocarbon residues in which the substituent is a halogen, hydroxy, alkoxy, alkenyloxy, carboalkyl, carboalkoxy, aryl, aroylalkyl, aroylalkenyl, cyano, nitro, or alkylsulfonylalkyl radical. Hence, it is evident that the organocobalt tetracarbonyls suitable for the purposes of this invention are the aliphatic, cycloaliphatic, and acylcobalt tetracarbonyls.

The reaction that takes place when an organocobalt tetracarbonyl of the general formula R—Co(CO)$_4$ is employed may be expressed by the following reaction:

(1)
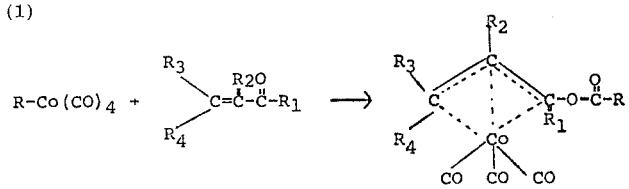

in which R has the same meaning as set forth hereinabove, R$_1$ can be hydrogen, alkyl, alkenyl, cycloalkyl, cycloalkenyl, aryl, aralkyl, aralkenyl, aroylalkyl, or aroylalkenyl, and R$_2$, R$_3$ and R$_4$ can each be hydrogen, alkyl, alkenyl, cycloalkyl, cycloalkenyl, aryl, aralkyl, aralkenyl, alkoxy, alkenyloxy, carboalkyl, carboalkoxy, carboalkoxyalkyl, aroylalkyl, aroylalkenyl, or halo and may be alike or different, or any two of R$_1$, R$_2$, R$_3$ and R$_4$ linked together may form an alicyclic ring.

The reaction that takes place when an organocobalt tetracarbonyl of the general formula $$R-\overset{O}{\underset{\|}{C}}-Co(CO)_4$$

is employed may be expressed by the following formula:

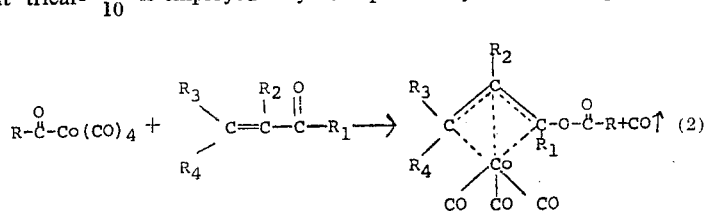

in which R, R$_1$, R$_2$, R$_3$ and R$_4$ have the same meaning as set forth hereinabove.

Instead of first synthesizing the organocobalt tetracarbonyl as a separate step as, for example, from an organic halide and a salt of cobalt hydrotetracarbonyl according to the following reaction:

$$RX + NaCo(CO)_4 \rightarrow R-Co(CO)_4 + NaX, \quad (3)$$

the organocobalt tetracarbonyl can be formed in situ, in which case the reaction that takes place in forming the 1-acryloxy-π-allylcobalt tricarbonyls of this invention may be expressed as:

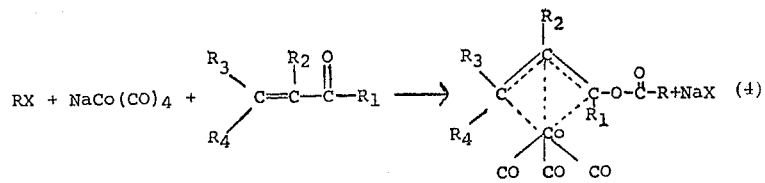

Reaction (4) above can be carried out in an atmosphere of carbon monoxide, and the same 1-acyloxy-π-allylcobalt tricarbonyls are formed as depicted by reaction (4). In this case, however, it has been observed that initially there is an absorption of carbon monoxide, and subsequently carbon monoxide is evolved. The initial adsorption of carbon monoxide corresponds to the in situ reaction of organohalide, salt of cobalt hydrotetracarbonyl and carbon monoxide to form an acylcobalt tetracarbonyl according to the following reaction:

$$RX + NaCo(CO)_4 + CO \longrightarrow R-\overset{O}{\underset{\|}{C}}-Co(CO)_4 + NaX \quad (5)$$

and the subsequent evolution of carbon monoxide corresponds to the in situ reaction of the acylcobalt tetracarbon formed according to reaction (5) with an α,β-unsaturated aldehyde or ketone according to reaction (2) above.

The new 1-acyloxy-π-allylcobalt tricarbonyls of this invention may be isolated as such, by distillation of the inert reaction diluent at low temperature, preferably under reduced pressure, or in some cases by distillation of the complex per se, or they may be isolated in the form of their monotriphenylphosphine derivatives which are usually higher melting and more stable than the tricarbonyl complex per se. These phosphine derivatives are easily prepared by adding triphenylphosphine to a solution of the tricarbonyl complex at about 0° C. to about 50° C. and then evaporating the reaction diluent to isolate the phosphine derivative. This reaction may be expressed as follows:

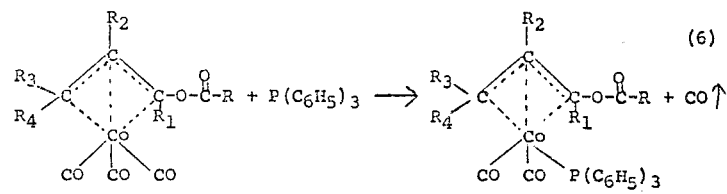
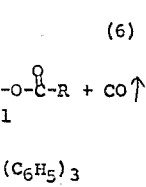

The new 1-acyloxy-π-allylcobalt tricarbonyl complexes are believed to have the structure set forth below where the three carbon atoms of the allyl group are in a plane above the cobalt atom. The allyl group appears to be more or less symmetrical and π-bonded to the cobalt. The allyl carbon atoms have been numbered as shown to aid in naming these compounds.

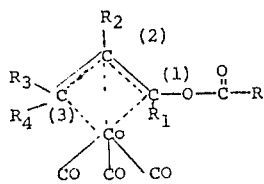

The following examples will illustrate the preparation of the new 1-acyloxy-π-allylcobalt tricarbonyls.

Example 1

In a nitrogen-filled closed reaction vessel containing a magnetic stirring bar were placed 30 ml. of 0.07 M sodium cobalt tetracarbonyl in diethyl ether solution, 1.0 ml. of methyl vinyl ketone and 0.5 ml. of methyl iodide. The reaction mixture was stirred magnetically at room temperature for one hour. During the reaction the solution became yellow and a colorless precipitate of sodium iodide was formed. The infrared spectrum of the reaction mixture showed carbonyl absorption bands at 1765, 2005 and 2070 cm.$^{-1}$, thus supporting formation of 1-acetoxy-1-methyl-π-allylcobalt tricarbonyl having the following structural formula:

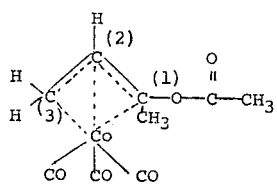

This compound may be isolated by evaporating the reaction diluent (diethyl ether) under nitrogen, but it is much more conveniently isolated as its monotriphenylphosphine derivative which is more stable, less soluble and higher melting. The triphenylphosphine derivative was obtained by adding 3.0 ml. of 1.0 M triphenylphosphine in diethyl ether solution to the above reaction mixture at room temperature. After 30 minutes the reaction was complete and about 2.1 mmoles of carbon monoxide had been evolved. The triphenylphosphine derivative thus formed was isolated by filtering the solution to remove the sodium iodide, evaporating the solvent in vacuum at room temperature and recrystallizing the residue three times from a mixture of methylene chloride and pentane by cooling in Dry Ice. The yellow crystalline product weighed 0.5 g. and decomposed on heating at 132°–139° C. The infrared spectrum of this triphenylphosphine derivative in chloroform solution had carbonyl absorption bands at 1740, 1945 and 2000 cm.$^{-1}$. Analysis showed that this product contained 63.96% carbon, 5.51% hydrogen and 6.8% phosphorous. The values calculated for the monotriphenylphosphine derivative are 63.68% carbon, 4.93% hydrogen and 6.32% phosphorous.

Example 2

The reaction described in Example 1 was carried out under carbon monoxide in a gasometric apparatus. The reaction mixture rapidly absorbed 35 ml. of carbon monoxide forming acetylcobalt tetracarbonyl initially, and then in about an hour and a half about 40 ml. of carbon monoxide were evolved. The same product was formed as in Example 1.

Example 3

In a nitrogen filled reaction vessel were placed 30 ml. of 0.07 M sodium cobalt tetracarbonyl in diethyl ether solution, 1.0 ml. of acrolein and 0.5 ml. of methyl iodide. The solution was mixed well and allowed to react at room temperature overnight. The reaction mixture become yellow and a colorless precipitate of sodium iodide was formed. The infrared spectrum of the yellow solution had carbonyl absorption bands at 1775, 2005 and 2070 cm.$^{-1}$ showing that 1-acetoxy-π-allylcobalt tricarbonyl having the following structural formula had been formed:

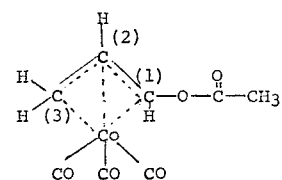

Again it was more convenient to isolate the compound as the triphenylphosphine derivative. For this purpose 3.0 ml. of 1.0 M triphenylphosphine in diethyl ether solution was added to the reaction mixture. After reacting for 2 hours at room temperature, the solution was centrifuged to remove insoluble material and the solvent was evaporated in vacuum at room temperature. The crystalline residue was recrystallized four times from a mixture of methylene chloride and pentane with cooling to −5° C. A yield of 0.3 g. of yellow-orange prisms having a melting point of 155–158° C. with decomposition was obtained. The infrared spectrum of this product in chloroform solution had carbonyl absorption bands at 1745, 1945 and 2000 cm.$^{-1}$. Analysis showed that the product contained 63.01% carbon, 4.93% hydrogen and 6.35% phosphorous. The values calculated for the monotriphenylphosphine derivative are 63.03% carbon, 4.66% hydrogen and 6.50% phosphorous. The nuclear magnetic resonance spectrum for the compound in deuterochloroform solution at 60 megacycles had bands at −102 c.p.s. (doublet, $J$=11.2 c.p.s.), −119 c.p.s. (singlet) (relative area of both bands 5), −280 c.p.s. (multiplet of relative area 1.1), −346 c.p.s. (doublet, $J$=7.5 c.p.s. with relative area 0.9) and −444 c.p.s. (multiplet), with respect to tetramethylsilane as an internal standard.

Example 4

A solution of 30 ml. of 0.07 M sodium cobalt tetracarbonyl in diethyl ether solution, 1.0 ml. of methyl vinyl ketone and 0.5 ml. of ethyl iodide was allowed to react under nitrogen in a closed reaction vessel for 3 days at room temperature. The infrared spectrum of the reaction mixture then had carbonyl absorption bands at 1755, 1975 and 2060 cm.$^{-1}$ providing good evidence that 1-propionyloxy-1-methyl-$\pi$-allylcobalt tricarbonyl having the following structural formula had been formed.

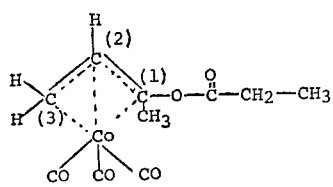

This compound was isolated as its monotriphenylphosphine derivative by adding 3 ml. of 1.0 M triphenylphosphine in diethyl ether solution to the reaction mixture, reacting for 90 minutes at room temperature, centrifuging to remove insoluble material and evaporating the solvent in vacuum at room temperature. The crystalline residue was recrystallized three times from a mixture of diethyl ether and pentane. The yellow-orange needles obtained, having a melting point of 105–107° C. with decomposition, weighed 0.2 g. The infrared spectrum of this product in chloroform solution had carbonyl absorption bands at 1745, 1930 and 1985 cm.$^{-1}$. Analysis showed that this product contained 64.39% carbon and 5.45% hydrogen. The values calculated for the monotriphenylphosphine derivative are 64.29% carbon and 5.20% hydrogen.

Example 5

In a nitrogen-filled reaction vessel were placed 30 ml. of 0.07 M sodium cobalt tetracarbonyl in diethyl ether solution, 1 ml. of acrolein and 2.5 ml. of 1.0 M benzoyl chloride in diethyl ether solution. After reacting at room temperature overnight, the reaction was completed by warming the reaction mixture in the closed reaction vessel under nitrogen at 50–60° C. for 30 minutes. The infrared spectrum of the reaction mixture showed carbonyl absorption bands at 1745, 1997 and 2065 cm.$^{-1}$ showing that 1-benzoyloxy-$\pi$-allylcobalt tricarbonyl having the following structural formula had been formed:

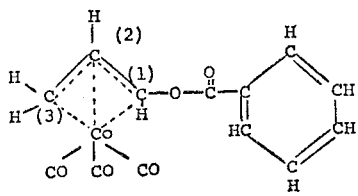

This compound was isolated as its monotriphenylphosphine derivative by adding 3 ml. of 1.0 M triphenylphosphine in diethyl ether solution to the reaction mixture, reacting for 90 minutes at room temperature, centrifuging to remove insoluble material and evaporating the solvent in vacuum at room temperature. The crystalline residue was recrystallized 3 times from a mixture of diethyl ether and pentane. Yellow-orange needles weighing 0.3 g. and melting at 133–135° C. were obtained. The infrared spectrum of this product in chloroform solution had carbonyl absorption bands at 1725, 1945 and 2000 cm.$^{-1}$. Analysis showed that this product contained 66.79% carbon and 4.78% hydrogen. The values calculated for the monotriphenylphosine derivative are 66.92% carbon and 4.49% hydrogen.

Example 6

A mixture of 12 ml. of 0.07 M sodium cobalt tetracarbonyl in diethyl ether solution, 0.5 ml. of acrolein and 1.5 ml. of 1.0 M ethyl bromoacetate in diethyl ether solution was allowed to react under nitrogen in a closed reaction vessel for two hours at room temperature and for an additional 20 minutes at about 70° C. under nitrogen in the same closed reaction vessel. After cooling, the infrared spectrum of the reaction mixture showed carbonyl absorption bands at 1750, 1980 and 2055 cm.$^{-1}$ indicating that 1-(ethoxycarbonylacetoxy)-$\pi$-allylcobalt tricarbonyl having the following structural formula had been formed:

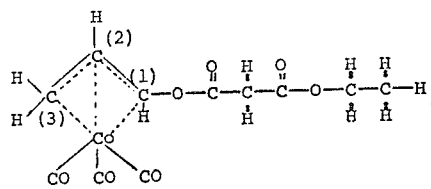

Example 7

A mixture of 30 ml. of 0.07 M sodium cobalt tetracarbonyl in diethyl ether solution, 1.0 ml. of cyclohexen-3-one and 3.0 ml. of 1.0 M ethyl bromoacetate in diethyl ether solution was allowed to react under nitrogen in a closed reaction vessel for one hour at room temperature. The infrared spectrum of the reaction mixture had carbonyl absorption bands at 1745, 2040 and 2110 cm.$^{-1}$ indicating that 1-(ethoxycarbonylacetoxy)-$\pi$-cyclohexenylcobalt tricarbonyl having the following structural formula had been formed:

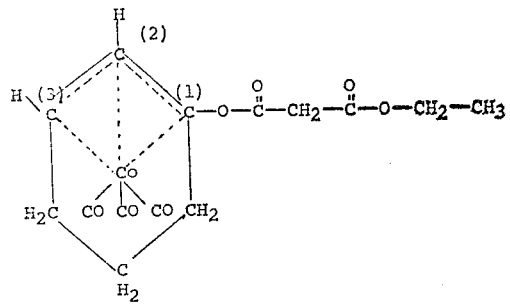

Example 8

A solution of 0.5 g. of benzalacetophenone in 30 ml. of 0.07 M sodium cobalt tetracarbonyl in diethyl ether and 0.5 ml. of methyl iodide was allowed to react under nitrogen in a closed reaction vessel for one hour at room temperature. At the end of this time the infrared spectrum of the reaction mixture had carbonyl absorption bands at 1770, 2000 and 2060 cm.$^{-1}$ indicating that 1-acetoxy-1,3-diphenyl-$\pi$-allylcobalt tricarbonyl having the following structural formula had been formed:

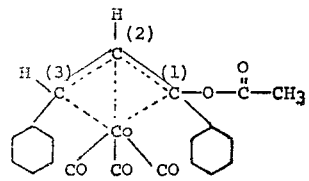

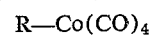

The organocobalt carbonyls required for the preparation of the 1-acyloxy-$\pi$-allylcobalt tricarbonyls of this invention can be prepared in a variety of ways. For example, organocobalt carbonyls of the general formula $$R\text{---}Co(CO)_4$$

can be prepared by the reaction of a salt of cobalt hydrotetracarbonyl with an organic halide which can be a monohalogen or dihalgen substituted organic compound containing at least one aliphatic or cycloaliphatic radical in which the halogen is attached to a primary or secondary carbon atom. Thus, the salt of cobalt hydrotetracarbonyl can be reacted with any organic halide having the general formula RX in which R can be alkyl, alkenyl, cycloalkyl, cycloalkenyl, aralkyl, or aralkenyl hydrocarbon residue, as well as substituted alkyl, alkenyl, cycloalkyl, cycloalkenyl, aralkyl or aralkenyl hydrocarbon residue in which the substituent can be halogen, hydroxy, alkoxy, alkenyloxy, carboalkyl, carboalkoxy, aryl, aroylalkyl, aroylalkenyl, cyano, nitro, alkylsulfonylalkyl, etc., and X is a halogen.

Some typical alkyl halides suitable for the purposes of this invention include, for example, methyl chloride, methylene chloride, methyl iodide, ethyl chloride, ethylene dichloride, ethyl bromide, propyl chloride, isopropyl chloride, n-butyl chloride, isobutyl bromide, secondary butyl chloride, tertiary butyl bromide, pentyl iodide, hexyl bromide, 2-iodooctane, 1,8-dibromooctane, undecyl chloride, stearyl bromide, allyl bromide, allyl chloride, butenyl chloride, crotyl chloride, crotyl bromide, methallyl chloride, undecenyl chloride, oleyl chloride, cyclopentyl chloride, cyclohexyl chloride, methyl cyclohexyl bromide, cyclobutyl chloride, tetrahydrofurfuryl chloride, cyclopentenyl bromide, cyclohexenyl iodide, 5-octenyl bromide, benzyl chloride, benzyl bromide, benzyl iodide, α-chloromesitylene, α-iodoxylene (ortho, meta, and para), α-naphthyl chloride, phenylpropyl chloride, phenylbutenyl bromide, chloroethyl bromide, chloroisopropyl chloride, chlorobutyl iodide, bromobutyl chloride, trifluoromethylethyl chloride, cyanomethyl bromide, cyanoethyl chloride, carbomethoxyethyl chloride, carboethoxybutyl chloride, p-bromophenylpropyl chloride, m-nitrophenylbutyl chloride, o-methoxybenzyl bromide, dichlorocyclohexane, hydroxyethyl chloride, hydroxypropyl bromide, hydroxycyclopentyl iodide, hydroxymethylbenzyl chloride, methoxyethyl bromide, methoxybutyl chloride, formylethyl chloride, acetylbutyl chloride, benzoylethyl chloride, p-bromobenzoylcyclopentyl chloride, methylsulfonylethyl bromide, p-chlorobenzyl chloride, m-nitrobenzyl chloride, o-methoxybenzyl bromide, ortho-, meta-, and para-methoxybenzyl chloride, α-monochloroxylene, α,α'-dichloroxylene, α-chloromethylnaphthalene, dichloromethyl naphthalene, cinnamyl chloride, chloromethyl methyl ether, β-chloroethyl ethyl ether, β,β'-dichlorodiethyl ether, chloromethyl isobutyl ether, β-bromoethyl vinyl ether, α-chloropropyl propyl ether, methyl chloroacetate, ethyl bromoacetate, methyl 3-chloropropionate, ethyl α-bromopropionate, methyl p-chloromethyl benzoate, ethyl chloroacetate, methyl chloropropionate, chloroacetonitrile, 3-chloropropionitrile, 3-bromobutyronitrile, 3-chloropropyl methyl ketone, chloromethyl methyl ketone, etc.

Instead of organic halides, as set forth above, there may be employed sulfuric acid diesters of the general formula $R_2SO_4$ and esters of sulfonic acids of the general formula $RR'SO_3$, wherein R in both formulas has the same meaning as described hereinabove in the discussion of organic halides suitable for the purposes of this invention, and R' is an alkyl, alkenyl, cycloalkyl, cycloalkenyl, aryl, aralkyl, aralkenyl, alkaryl, or alkenylaryl radical.

Some typically suitable sulfuric acid diesters include, by way of example, dialkyl sulfates such as dimethyl sulfate, diethyl sulfate, dipropyl sulfate, diisopropyl sulfate, dibutyl sulfate, dihexyl sulfate, dioctyl sulfate, didodecyl sulfate, and the like; dialkenyl sulfates such as diallyl sulfates, dipentenyl sulfate, dimethallyl sulfate, and the like; dicycloalkyl sulfates such as dicyclopentyl sulfate, dicyclohexyl sulfate, dimethylcyclohexyl sulfate, and the like; dicycloalkenyl sulfates such as dicyclopentenyl sulfate, dicyclohexenyl sulfate, dimethylcyclohexenyl sulfate, and the like; diaralkyl sulfates such as dibenzyl sulfate, diphenethyl sulfate, di-α-naphthylmethyl sulfate, and the like; as well as dialkoxy alkyl sulfates, diacylalkyl sulfates, diacyloxyalkyl sulfates, dicyanoalkyl sulfates, dihaloalkyl sulfates, and any other sulfate diester of the general formula $R_2SO_4$ wherein R has the same meaning hereinbefore defined.

Any sulfonic acid may be employed for preparing sulfonic acid esters of the formula $RR'SO_3$, and include, by way of example, alkyl sulfonic acids, alkenyl sulfonic acids, cycloalkyl sulfonic acids, cycloalkenyl sulfonic acids, aryl sulfonic acids, aralkyl sulfonic acids, aralkenyl sulfonic acids, alkaryl sulfonic acids, alkenylaryl sulfonic acids, and the like, such as methanesulfonic acid, ethanesulfonic acid, ethylene sulfonic acid, o-, m-, or p-toluenesulfonic acids, naphthalenesulfonic acid, α-methylnaphthalenesulfonic acid, and the like. Some typically suitable sulfonic acid esters include methyl p-toluenesulfonate, octyl methanesulfonate, benzyl ethylenesulfonate, cyclohexyl α-toluenesulfonate, allyl cyclohexanesulfonate, and any other sulfonic acid ester of the general formula $RR'SO_3$ wherein R and R' have the same meanings as hereinbefore defined.

Any salt of cobalt hydrotetracarbonyl may be employed for reaction with an organohalide, sulfate, or sulfonate to prepare organocobalt tetracarbons of the general formula $R—Co(CO)_4$, and salt-forming cations include those derived from metal atoms capable of forming salts of cobalt hydrotetracarbonyl, as well as ammonium and quaternary ammonium radicals. By way of example, but not in limitation, suitable metal cations include those derived from the alkali metals such as lithium, sodium, potassium, and the like; alkaline earth metals such as magnesium, calcium, strontium, and the like; and various other metals such as mercury, zinc, aluminum, tin, titanium, iron, cobalt, and the like substantially without limitation. Preferred metal salts of cobalt hydrotetracarbonyl for the purposes of this invention are those which are soluble in the reaction mixture such as sodium cobalt tetracarbonyl and other alkali metal, ammonium-, and quaternary-ammonium cobalt tetracarbonyl salts, and can therefore be used for in situ preparations as depicted by reaction (4) and similar in situ preparations.

Cobalt tetracarbonyl salts are known materials, and various methods for preparing them are described in the literature. For example, preparation of sodium cobalt tetracarbonyl has been described in Z. Naturforsch., vol. 13B, page 192 (1938).

Sodium cobalt tetracarbonyl can be conveniently prepared by shaking cobalt octacarbonyl with excess 1% sodium amalgam in diethyl ether in a nitrogen atmosphere for about 5 hours at room temperature, to prepare a saturated ether solution of the sodium salt (about 0.07 M). The color of the ether solution changes from dark red to colorless, thus indicating conversion of the colored cobalt octacarbonyl to colorless sodium cobalt tetracarbonyl. This ether solution, after separation from the excess sodium amalgam by decantation, filtration, centrifuging, or the like, may be used directly, as shown by the examples. Cobalt octacarbonyl is usually prepared shortly before use by reacting a cobalt salt such as cobalt acetate or carbonate in an inert hydrocarbon solvent with an excess of equal parts of carbon monoxide and hydrogen at a temperature between about 150° and about 170° C. and at a pressure of about 2000 pounds per square inch overnight with agitation. Upon chilling, orange colored crystalline cobalt octacarbonyl separates from the hydrocarbon diluent.

Organocobalt tetracarbonyls of the general formula $R—Co(CO)_4$ can also be prepared by the reaction of cobalt hydrotetracarbonyl with ethylenically unsaturated compounds (olefinic compounds) of the general formula $R''CH=CH_2$, in which R'' represents a radical of the group consisting of hydrogen, saturated and ethylenically unsaturated aliphatic radicals, saturated and ethylenically unsaturated cycloaliphatic radicals and aromtic radicals. Thus, R'' can be hydrogen or any alkyl, alkenyl, cycloalkyl, cycloalkenyl, aryl, aralkyl, aralkenyl, alkaryl or alkenylaryl hydrocarbon residue, as well as any substituted alkyl, alkenyl, cycloalkyl, cycloalkenyl, aryl, aralkyl, aralkenyl, alkaryl, or alkenylaryl hydrocarbon residue in which the substituent can be halogen, hydroxy, alkoxy, alkenyloxy, carboalkyl, carboalkoxy, aryl, aroylalkyl, aroylalkenyl, cyano, nitro, alkylsulfonylalkyl, etc. Some typical olefins include, by way of example, ethylene, propylene, cis-2-butene, isobutylene, 1-pentene, cyclopentene, cyclohexene, styrene, vinyl cyclohexene, butadiene, isoprene, etc., and substituted olefins such as methyl acrylate, methyl 3-butenoate, 4-chloro-1-butene, divinyl ether, vinyl acetate, etc.

Cobalt hydrotetracarbonyl is a known material, and various methods for preparing it are described in the literature. For example, one such method has been described by H. W. Sternberger et al., J. Am. Chem. Soc., 75, page 2717 (1953). In brief, the method described involves initial reaction of cobalt octacarbonyl with pyridine, adding the pyridine reaction product dropwise to dilute sulfuric acid at 0° C. while bubbling carbon monoxide through the reaction bath to sweep out cobalt hydrotetracarbonyl as it is formed, and condensing the cobalt hydrotetracarbonyl in a cold trap chilled with liquid nitrogen.

Another method for preparing organocobalt tetracarbonyls of the general formula $R-Co(CO)_4$ for use in this invention is by the reaction of cobalt hydrotetracarbonyl with epoxides of the general formula

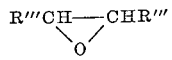

in which each R''' which may be the same or different represents a radical of the group consisting of hydrogen, saturated and ethyllenically unsaturated aliphatic radicals, saturated and ethylenically unsaturated cycloaliphatic radicals and aromatic radicals. Thus, each R''' can be hydrogen, or any alkyl, alkenyl, cycloalkyl, cycloalkenyl, aryl, aralkyl, aralkenyl, alkarayl, or alkenylaryl hydrocarbon residue, as well as any substituted alkyl, alkenyl, cycloalkyl, cycloalkenyl, aryl, aralkyl, aralkenyl, alkaryl, or alkenylaryl hydrocarbon residue in which the substituent can be halogen, hydroxy, alkoxy, alkenyloxy, carboalkyl, carboalkoxy, aryl, aroylalkyl, aroylalkenyl, cyano, nitro, alkylsulfonylalkyl, and the like. Exemplary of the epoxides which can be used are the vicinal epoxides such as ethylene oxide, propylene oxide, cis-2-butene oxide, trans-2-butene oxide, 1-butene oxide, isobutylene oxide, cyclopentene oxide, cyclohexene oxide, butadiene monoxide, butadiene dioxide, methyl glycidate, epichlorohydrin, styrene oxide, α-methylstyrene oxide, epoxyallyl alcohol, vinylcyclohexane oxide, vinylcyclohexene monoxide, vinylcyclohexene dioxide, epoxyoleic acid, epoxycholesterol, etc. In addition to the vicinal epoxides, other epoxides such as trimethylene oxide and substituted trimethylene oxides wherein the substituent may be a saturated or ethylenically unsaturated aliphatic or cycloaliphatic radical, or aromatic radical. Exemplary of these substituted trimethylene oxides are 1-methyltrimethylene oxide, 2-methyltrimethylene oxide, 1-chloromethyltrimethylene oxide, 2,2 - bis(chloromethyl)trimethylene oxide, phenyltrimethylene oxide, dimethyltrimethylene oxide, etc.

It is clearly apparent from the foregoing description that organocobalt tetracarbonyls of the general formulas $R-Co(CO)_4$ and

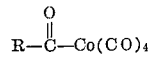

are equivalent for the purposes of this invention, R in both formulas having the same meaning, as pointed out hereinabove. Organocobalt tetracarbonyls of the general formula

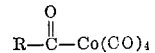

are readily prepared by reacting organocobalt tetracarbonyls of the general formula $R-Co(CO)_4$ with carbon monoxide, as expressed by the following equation:

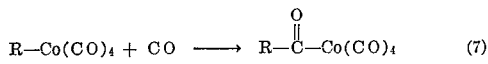

Accordingly, therefore, organocobalt tetracarbonyls of the general formula

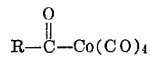

can be prepared from any of the materials and methods described above for preparing organocobalt tetracarbonyls of the general formula $R-Co(CO)_4$, simply by carrying the reaction out in the presence of at least a stoichiometric amount of carbon monoxide. Organocobalt tetracarbonyls of the general formula

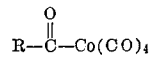

can also be prepared by reaction of any acyl halide of the general formula

and a salt of cobalt hydrotetracarbonyl, R in the acyl halide having the same meaning as defined hereinbefore, and X representing halogen.

Some typical acyl halides which can be employed include, for example, acetyl chloride, acetyl bromide, propionyl chloride, isobutyroyl bromide, secondary butyroyl chloride, tertiary butyroyl bromide, hexanoyl bromide, octanoyl chloride, undecanoyl chloride, acrylyl bromide, crotonyl chloride, 3,3-dimethyl acrylyl chloride, 10-undecenoyl chloride, 2,4-pentadienoyl chloride, 2,4-hexadienoyl chloride (sorbyl chloride) oleoyl chloride, cyclopentylacetyl chloride, cyclohexylacetyl chloride, cyclopentylcarbonyl bromide, cyclobutyroyl chloride, cyclopentenylcarbinol chloride, benzoyl chloride, benzoyl bromide, p-toluoyl chloride, α-naphthylacetyl chloride, α-naphthoyl chloride, α-anthracylacetyl bromide, α-anthracyloyl chloride, xylyloyl chloride, p-tertiarybutyl benzoyl chloride, chloroacetyl bromide, bromoacetyl chloride, iodobutyroyl chloride, trifluoromethylacetyl chloride, cyanoformyl bromide, cyanoacetyl chloride, carbomethoxyacetyl chloride, carboethoxybutyroyl chloride, phenylpropionyl chloride, p-bromophenylpropionyl chloride, m-nitrophenylbutyroyl chloride, o-methoxybenzoyl bromide, chlorocyclohexylcarbonyl chloride, methoxyacetyl bromide, methoxybutenoyl chloride, formylacetyl chloride, acetylbutyroyl chloride, benzoylacetyl chloride, p-bromobenzoylcyclopentylcarbonyl chloride, methylsulfonylacetyl bromide, 1-chlorobenzoyl chloride, m-nitrobenzoyl chloride, o-methoxybenzoyl bromide, 3,4-methylenedioxybenzoyl chloride, 2,4-dichlorobenzoyl chloride, p-allyloxybenzoyl chloride, pivalyloyl chloride, cinnamoyl chloride, monomethylsuccinoyl chloride, 2-cyanopropionyl chloride, terephthaloyl chloride, adipoyl chloride, 5-chloropentanoyl chloride, trimethylacetyl bromide, etc.

Any α,β-unsaturated aldehyde or ketone of the general formula

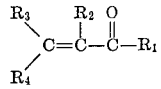

in which $R_1$ can be hydrogen, alkyl, alkenyl, cycloalkyl, cycloalkenyl, aryl, aralkyl, aralkenyl, aroylalkyl, or aroylalkenyl, and $R_2$, $R_3$ and $R_4$, which may be the same or different, can be hydrogen, alkyl, alkenyl, cycloalkyl, cycloalkenyl, aryl, aralkyl, aralkenyl, alkoxy, alkenyloxy, carboalkyl, carboalkoxy, carboalkoxyalkyl, aroylalkyl, aroylalkenyl, or halogen, or any two of $R_1$, $R_2$, $R_3$ and $R_4$ linked together may form an alicyclic ring, is suitable for the purposes of this invention.

Some typical examples of suitable α,β-unsaturated aldehydes include, by way of example, acrolein, crotonaldehyde, α-methacrolein, cinnamaldehyde, α-phenylacrolein, 2-pentenal, 2-octenal, α-ethylacrolein, α,β-dimethylacrolein, β-methylcrotonaldehyde, α-methyl-β-ethylacrolein, 2-dodecenal, 3,7-dimethyloctadiene-2,6-al, nonadiene-2,6-al, 1-phenyl-pentadiene-1,3-al, and the like.

Some typical examples of suitable α,β-unsaturated ketones include, by way of example, methyl vinyl ketone, propenyl methyl ketone, propenyl phenyl ketone, isopropenyl methyl ketone, propenyl propyl ketone, phenylpropenyl methyl ketone, 2-methylpenten-2-one-4, 2,6-dimethyl-heptadiene-2,5-one-4, hexene-3-one-2, vinyl phenyl ketone, octen-7-dione-2,5, benzalacetophenone, benzal acetone, benzal propiophenone, methyl cyclopentenone, carvone, cyclohexen - 1 - dione-3,5, 1-acetyl-cyclohexen-1-methyl-4, p-menthene-3-one, cyclohexen-1-one-3, and the like.

The reaction of the organocobalt tetracarbonyl and α,β-unsaturated aldehyde or ketone is most conveniently carried out in solution in an inert liquid organic solvent, and a variety of such solvents can be used as the inert reaction medium for the process of this invention. For example, the reaction can be carried out in substantially any liquid organic solvent which is nonreactive under the reaction conditions employed with the starting reactants and the products formed, such as, for example, ethers, ketones, esters, amides, sulfoxides, nitriles, hydrocarbons, etc. Exemplary of suitable inert reaction media which can be used are dimethyl ether, diethyl ether, diisopropyl ether, dibuytl ether, anisole, dioxane, tetrahydrofuran, ethylene glycol dimethyl ether, diethylene glycol dimethyl ether, acetone, methyl ethyl ketone, diethyl ketone, methyl isobutyl ketone, cyclohexanone, methylacetate, ethylacetate, dimethylformamide, dimethylsulfoxide, acetonitrile, pentane, hexane, heptane, petroleum ether, cyclopentane, cyclohexane, methyl cyclohexane, benzene, toluene, etc. When salts of cobalt hydrotetracarbonyl are employed, the reaction will proceed only at an appreciable rate if the reaction is carried out in the more polar reaction diluents such as the ethers, ketones or esters in which the salt is at least partially soluble. The ethers are the preferred inert reaction media.

The reaction between organocobalt tetracarbonyls and α,β-unsaturated aldehydes or ketones occurs readily over a wide range of temperature conditions, depending somewhat upon the other reaction conditions. However, since the cobalt complexes generally become less stable as the temperature is raised, lower temperatures are usually preferred. Generally this reaction is carried out at a temperature from about 0° C. to about 150° C., and preferably from about 10° C. to about 100° C. Since the reaction intermediates and products are oxidized by air, the reaction is best carried out under an inert atmosphere such as carbon monoxide, nitrogen, argon, or helium. Any molar ratio of the organocobalt, tetracarbonyl and α,β-unsaturated aldehyde or ketone may be used, but generally an excess over stoichiometric requirement of the α,β-unsaturated aldehyde or ketone is preferred.

It has been noted hereinabove that in situ reactions of the type depicted by reaction Equation 4, wherein an organohalide, a salt of cobalt hydrotetracarbonyl, and an α,β-unsaturated aldehyde or ketone are employed, can be carried out in an atmosphere of carbon monoxide to obtain the same 1-acyloxy-π-allylcobalt tricarbonyls as formed by reaction 4. In these cases, the pressure of carbon monoxide on the reaction mixture is preferably from about 0.1 atmosphere to about 3 atmospheres. Carbon monoxide pressures appreciably above about 3 atmospheres tend to retard and inhibit formation of the 1-acyloxy-π-allylcobalt tricarbonyl product.

From the foregoing description it is apparent that this invention provides a completely new class of useful organocobalt compounds, namely, the 1-acyloxy-π-allylcobalt tricarbonyls, and provides a method for their preparation. These compounds are useful as chemical intermediates in other chemical reactions. For example, they are useful in a coupling reaction with an allylic halide to produce acyloxyhexadienes. Moreover, the 1-acyloxy-π-allylcobalt tricarbonyls are very soluble forms of cobalt and, hence, are useful as catalysts for oxidation, etc., and as drying agents for oil paints and protective coatings.

What I claim and desire to protect by Letters Patent is:

1. As a new composition of matter, a 1-acyloxy-π-allylcobalt tricarbonyl.
2. 1-acetoxy-1-methyl-π-allylcobalt tricarbonyl.
3. 1-acetoxy-π-allylcobalt tricarbonyl.
4. 1-propionyloxy-1-methyl-π-allylcobalt tricarbonyl.
5. 1-benzoyloxy-π-allylcobalt tricarbonyl.
6. 1-(ethoxycarbonylacetoxy) - π - allylcobalt tricarbonyl.
7. 1-(ethoxycarbonylacetoxy) - π - cyclohexenylcobalt tricarbonyl.
8. 1-acetoxy-1,3-diphenyl-π-allylcobalt tricarbonyl.
9. The process of preparing a 1-acyloxy-π-allylcobalt tricarbonyl which comprises reacting a compound of the group consisting of α,β-unsaturated aldehydes and α,β-unsaturated ketones with an organocobalt tetracarbonyl of the group consisting of aliphatic, cycloaliphatic, and acylcobalt tetracarbonyls.
10. The process of claim 9 wherein the organocobalt tetracarbonyl is formed in situ by reacting a salt of cobalt hydrotetracarbonyl with an organic compound of the group consisting of aliphatic, cycloaliphatic, and acyl halides, sulfates and sulfonates.
11. The process for preparing 1-acetoxy-1-methyl-π-allylcobalt tricarbonyl which comprises reacting together methyl vinyl ketone, sodium cobalt tetracarbonyl, and methyl iodide.
12. The process for preparing 1-acetxy-π-allylcobalt tricarbonyl which comprises reacting together acrolein, sodium cobalt tetracarbonyl and methyl iodide.
13. The process for preparing 1-propionyloxy-1-methyl-π-allylcobalt tricarbonyl which comprises reacting together methyl vinyl ketone, sodium cobalt tetracarbonyl and ethyl iodide.
14. The process for preparing 1-benzoyloxy-π-allylcobalt tricarbonyl which comprises reacting together acrolein, sodium cobalt tetracarbonyl and benzoyl chloride.
15. The process for preparing 1-(ethoxycarbonylacetoxy)-π-allylcobalt tricarbonyl which comprises reacting together acrolein, sodium cobalt tetracarbonyl and ethyl bromoacetate.
16. The process of preparing 1-(ethoxycarbonylacetoxy)-π-cyclohexenylcobalt tricarbonyl which comprises reacting together cyclohexen-3-one, sodium cobalt tetracarbonyl and ethyl bromoacetate.
17. The process of preparing 1-acetoxy-1,3-diphenyl-π-allylcobalt tricarbonyl which comprises reacting together benzalacetophenone, sodium cobalt tetracarbonyl and methyl iodide.

References Cited

UNITED STATES PATENTS 3,137,715  6/1964  Heck _____ 260—439

OTHER REFERENCES

Goetz et al.: J. Am. Chem. Soc., 85 (1963), pp. 2782-4.

TOBIAS E. LEVOW, *Primary Examiner.*

A. P. DEMERS, *Assistant Examiner.*